United States Patent
Lau

(10) Patent No.: US 11,536,831 B2
(45) Date of Patent: Dec. 27, 2022

(54) SYSTEMS AND METHODS FOR HIGH VELOCITY RESOLUTION HIGH UPDATE RATE RADAR FOR AUTONOMOUS VEHICLES

(71) Applicant: GM Cruise Holdings LLC, San Francisco, CA (US)

(72) Inventor: Zhi Yuan Sherwin Lau, Berkeley, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 141 days.

(21) Appl. No.: 16/901,231

(22) Filed: Jun. 15, 2020

(65) Prior Publication Data
US 2021/0389452 A1 Dec. 16, 2021

(51) Int. Cl.
*G01S 13/931* (2020.01)
*G01S 13/34* (2006.01)
*G01S 7/35* (2006.01)

(52) U.S. Cl.
CPC ............ *G01S 13/931* (2013.01); *G01S 7/352* (2013.01); *G01S 13/347* (2013.01); *G01S 2013/9317* (2013.01); *G01S 2013/9319* (2020.01); *G01S 2013/9321* (2013.01); *G01S 2013/9323* (2020.01); *G01S 2013/93185* (2020.01)

(58) Field of Classification Search
CPC .... G01S 13/931; G01S 13/584; G01S 13/343; G01S 13/345; G01S 7/352; G01S 7/347; G01S 7/354

USPC .................................................... 342/70, 128
See application file for complete search history.

(56) References Cited

U.S. PATENT DOCUMENTS

| | | | | |
|---|---|---|---|---|
| 5,181,038 A | * | 1/1993 | Asbury | G01S 13/53 342/101 |
| 5,189,426 A | * | 2/1993 | Asbury | G01S 13/52 342/101 |
| 5,285,207 A | * | 2/1994 | Asbury | G01S 13/86 342/112 |
| 5,311,183 A | * | 5/1994 | Mathews | G01S 13/953 342/26 B |
| 5,400,032 A | * | 3/1995 | Asbury | G01S 13/24 342/129 |
| 5,610,610 A | * | 3/1997 | Hudson | G01S 13/9064 342/25 F |

(Continued)

*Primary Examiner* — Erin F Heard
*Assistant Examiner* — Michael W Justice
(74) *Attorney, Agent, or Firm* — Calfee, Halter & Griswold LLP

(57) ABSTRACT

An autonomous vehicle (AV) includes a radar sensor system and a computing system that computes velocities of an object in a driving environment of the AV based upon radar data that is representative of radar returns received by the radar sensor system. The AV can be configured to compute a first velocity of the object based upon first radar data that is representative of the radar return from a first time to a second time. The AV can further be configured to compute a second velocity of the object based upon second radar data that includes at least a portion of the first radar data and further includes additional radar data representative of a radar return received subsequent to the second time. The AV can further be configured to control one of a propulsion system, a steering system, or a braking system to effectuate motion of the AV based upon the computed velocities.

20 Claims, 7 Drawing Sheets

(56) References Cited

U.S. PATENT DOCUMENTS

| | | | | |
|---|---|---|---|---|
| 6,018,311 | A * | 1/2000 | David | G01S 7/292 342/162 |
| 6,538,599 | B1 * | 3/2003 | David | G01S 13/582 342/104 |
| 6,621,450 | B1 * | 9/2003 | Carter | G01S 13/227 342/159 |
| 7,425,917 | B2 * | 9/2008 | Nakanishi | G01S 13/584 342/107 |
| 7,489,265 | B2 | 2/2009 | Egri et al. | |
| 9,261,590 | B1 | 2/2016 | Brown | |
| 9,435,883 | B2 * | 9/2016 | Moriuchi | G01S 7/03 |
| 9,784,820 | B2 | 10/2017 | Arage | |
| 10,527,718 | B2 * | 1/2020 | Matsumoto | G01S 13/343 |
| 10,551,488 | B2 | 2/2020 | Cornic et al. | |
| 10,663,571 | B2 | 5/2020 | Halbert et al. | |
| 10,890,919 | B2 * | 1/2021 | Smith | B60W 10/20 |
| 11,016,171 | B2 * | 5/2021 | Melzer | G01S 13/931 |
| 11,035,931 | B1 * | 6/2021 | Kipp | G01S 13/935 |
| 11,054,515 | B2 * | 7/2021 | Cohen | G01S 13/58 |
| 11,231,482 | B2 * | 1/2022 | Bialer | G01S 7/35 |
| 11,275,173 | B2 * | 3/2022 | Wang | G06V 20/58 |
| 2005/0110675 | A1 | 5/2005 | Gruener et al. | |
| 2015/0057833 | A1 * | 2/2015 | Moriuchi | G01S 7/03 343/893 |
| 2017/0082744 | A1 * | 3/2017 | Matsumoto | G01S 7/352 |
| 2018/0095163 | A1 * | 4/2018 | Lovberg | G01S 13/325 |
| 2019/0072668 | A1 | 3/2019 | Duque Biarge et al. | |
| 2019/0094877 | A1 * | 3/2019 | Smith | G01S 7/06 |
| 2019/0242972 | A1 * | 8/2019 | Melzer | G01S 13/93 |
| 2019/0293749 | A1 * | 9/2019 | Itkin | G01S 13/931 |
| 2019/0391250 | A1 * | 12/2019 | Cohen | G01S 13/87 |
| 2020/0371228 | A1 * | 11/2020 | Wang | G01S 13/931 |
| 2021/0011119 | A1 * | 1/2021 | Bialer | G01S 13/343 |
| 2021/0018594 | A1 * | 1/2021 | Kipp | G01S 7/412 |
| 2021/0089047 | A1 * | 3/2021 | Smith | B62D 15/025 |

* cited by examiner

SYSTEMS AND METHODS FOR HIGH VELOCITY RESOLUTION HIGH UPDATE RATE RADAR FOR AUTONOMOUS VEHICLES

BACKGROUND

An autonomous vehicle (AV) is a motorized vehicle that can operate without human conduction. An exemplary AV includes a plurality of sensor systems, such as, but not limited to, a lidar sensor system, a camera sensor system, and a radar sensor system, amongst others, wherein the AV operates based upon sensor signals output by the sensor systems. For example, a radar system can identify a range from the AV to another vehicle in the driving environment. In another example, a radar system can determine a three-dimensional position of a point on a surface of an object in the driving environment (e.g., which point reflects a radar signal emitted by the radar system. In still another example, a radar system can determine a radar cross section of an object or a velocity of an object. In further examples, an object recognition system may be configured to receive lidar signals output by a lidar sensor system and to identify positions of objects captured in the images. In yet another example, a perception system can be configured to receive radar data from the radar system and to compute a velocity of an object relative to the AV based upon the radar data. A velocity resolution of a radar system is a measure of the ability of the radar system to measurably distinguish between different velocities of an object. By way of example, a velocity resolution of 1 m/s allows 1 m/s to be distinguished from 3 m/s, but not from 1.2 m/s. In another example, a velocity resolution of 0.1 m/s allows 1.0 m/s to be distinguished from 1.2 m/s but not from 1.05 m/s.

Due to limitations of physics, the velocity resolution of a radar system is limited by the dwell time on target. In other words, to increase the velocity resolution of a radar system (e.g., from 1 m/s to 0.1 m/s), the radar system must receive radar reflections from a target for a longer period of time. Conventionally, the update rate of the velocity determined by radar systems has been limited by the desired velocity resolution. For instance, a conventional radar system receives a radar return for a first period of time and computes a corresponding velocity with a resolution that is determined by the length of the first period of time. To compute an additional velocity measurement with the same resolution, the conventional radar system receives an additional radar return over a second period of time that is as long as the first period of time, and computes an additional velocity measurement. Thus, the conventional radar system generates velocity measurements only as fast as the period of time required to receive a radar return that yields the desired velocity resolution. Accordingly, autonomous vehicles that employ radar to determine the velocity of objects have generally not been able to update the velocities of objects as fast as data is received from other sensors (e.g., lidar sensors or cameras).

SUMMARY

The following is a brief summary of subject matter that is described in greater detail herein. This summary is not intended to be limiting as to the scope of the claims.

Described herein are various technologies pertaining to controlling operation of an AV. With more specificity, described herein are various technologies pertaining to an AV that includes a radar system that is configured to compute velocities of objects in a driving environment of the AV based upon overlapping sets of radar data. These technologies facilitate repeatedly computing a velocity of an object in the driving environment at a higher rate given a same velocity resolution than possible with conventional radar processing systems.

In an exemplary embodiment, an AV includes a continuous wave (CW) radar system, which emits a CW radar signal into the driving environment of the AV. The radar system receives a reflection of the radar signal, called a radar return, from an object in the driving environment over a first period of time. A computing system included on the AV computes a first velocity of the object based upon first radar data that is representative of the radar return over the first period of time. The first radar data can be generated by digitally sampling an analog electrical signal output by the radar system responsive to the radar system receiving the radar return at a radar antenna. The first velocity can be computed to a first velocity resolution that is based upon a length of the first period of time.

Subsequent to the first period of time, the radar system receives an additional radar return from the object over a second period of time. The radar system outputs second radar data that is representative of this additional radar return. The computing system of the AV can compute a second velocity of the object based upon the second radar data and a portion of the first radar data, wherein the second velocity is a velocity of the object at a time subsequent to a time corresponding to the first velocity. In an exemplary embodiment, the computing system computes the second velocity based upon the second radar data and a portion of the first radar data that excludes an oldest portion of the first radar data having a same duration as the second period of time. The computing system can control operation of the AV based upon the first and second velocities. For instance, the computing system can control mechanical systems of the AV to cause the AV to avoid a potential collision with the object indicated by the computed velocities.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
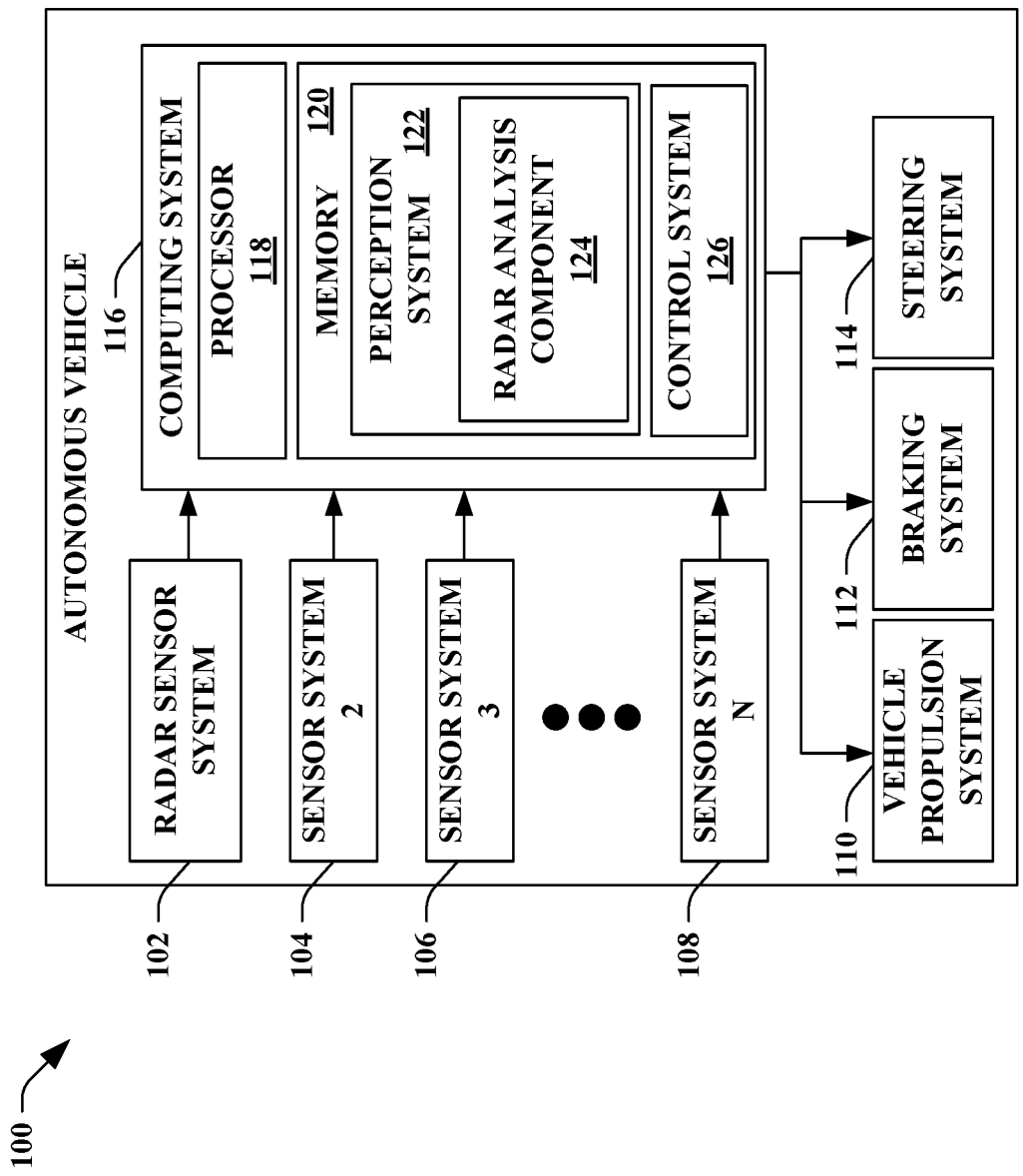
FIG. 1 is a functional block diagram of an exemplary AV.

Various technologies pertaining to controlling an AV based upon radar measurements of velocities of objects positioned about the AV are described herein, wherein like reference numerals are used to refer to like elements throughout. With more particularity, technologies described herein facilitate repeatedly computing velocities of objects in a driving environment of the AV at a higher rate than possible with conventional doppler radar processing techniques, while maintaining a same or greater velocity resolution. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

With reference now to FIG. 1, an exemplary AV 100 is illustrated. The AV 100 can navigate about roadways without human conduction based upon sensor signals output by sensor systems of the AV 100. The AV 100 includes a radar sensor system 102 and a plurality of additional sensor systems 104-108 (a second sensor system 104 through an Nth sensor system 108). The sensor systems 104-108 may be of different types. For example, the second sensor system 104 may be a lidar sensor system, the third sensor system 106 may be a camera (image) system, and the Nth sensor system 108 may be a sonar system. Other exemplary sensor systems include GPS sensor systems, inertial sensor systems, infrared sensor systems, and the like. The various sensor systems 102-108 are arranged about the AV 100. The sensor systems 102-108 are configured to repeatedly (e.g. continuously, or periodically) output sensor data that is representative of objects and conditions in the driving environment of the AV 100.

The AV 100 further includes several mechanical systems that are used to effectuate appropriate motion of the AV 100. For instance, the mechanical systems can include but are not limited to, a vehicle propulsion system 110, a braking system 112, and a steering system 114. The vehicle propulsion system 110 may be an electric engine, an internal combustion engine, or a combination thereof. The braking system 112 can include an engine brake, brake pads, actuators, a regenerative braking system, and/or any other suitable componentry that is configured to assist in decelerating the AV 100. The steering system 114 includes suitable componentry that is configured to control the direction of movement of the AV 100.

The AV 100 additionally comprises a computing system 116 that is in communication with the sensor systems 102-108 and is further in communication with the vehicle propulsion system 110, the braking system 112, and the steering system 114. The computing system 116 includes a processor 118 and memory 120 that includes computer-executable instructions that are executed by the processor 118. In an example, the processor 118 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 120 comprises a perception system 122 that is configured to identify objects (in proximity to the AV 100) captured in sensor signals output by the sensor systems 102-108. By way of example, the perception system 122 can be configured to identify the presence of an object in the driving environment of the AV 100 based upon images generated by a camera system included in the sensor systems 104-108. In another example, the perception system 122 can be configured to determine a range to an object in the driving environment of the AV 100, a three-dimensional position of the object, or a radar cross-section of the object, based upon radar returns received by the radar sensor system 102. The perception system 122 can further be configured to identify one or more features of an object in the driving environment of the AV 100. In a non-limiting example, the perception system 122 can be configured to determine a type of an object (e.g., a vehicle, a pedestrian, a bicycle, etc.) based upon images output by a camera, the presence of which object was detected by the perception system 122. By way of further example, and not limitation, the perception system 122 can be configured to determine a velocity of an object in the driving environment based upon radar returns received from the object by the radar sensor system 102.

The perception system 122 includes a radar analysis component 124. Briefly, and as will be described in greater detail below, the radar analysis component 124 is configured to determine a velocity of an object in a driving environment of the AV 100 based upon radar returns received by the radar sensor system 102. The radar analysis component 124 determines the velocity of an object based upon radar returns received from the object by the radar sensor system 102 over a period of time. The radar analysis component 124 determines the velocity of the object based upon a frequency shift of the received returns relative to signals transmitted into the driving environment of the AV 100 by the radar sensor system 102. The frequency shift can be determined according to various techniques. By way of example, and not limitation, the frequency shift can be determined by mixing the received returns with a copy of the transmitted signal to generate a signal that has a beat frequency corresponding to the frequency shift between the received return and the transmitted signal. In a further non-limiting example, the frequency shift can be determined based upon a stop-and-hop method, wherein the frequency shift is computed based upon a fast Fourier transform (FFT) of the received returns.

The perception system 122 may further include various additional components that are configured to output data indicative of positions and/or predefined types of objects in a driving environment of the AV 100. By way of example, the perception system 122 can include a component configured to identify the status of traffic lights (e.g., red, yellow, or green) or the presence of other traffic signage. In another example, the perception system 122 can include a component configured to distinguish between small vehicles (such as cars) and large vehicles (such as semi-trucks). In still another example, the perception system 122 can include a component configured to identify obstructions in a roadway on which the AV 100 is traveling.

The memory 120 additionally includes a control system 126 that is configured to receive output of the perception system 122, and is further configured to control at least one of the mechanical systems of the AV 100 (the vehicle propulsion system 110, the braking system 112, and/or the steering system 114) based upon the output of the perception system 122. In an exemplary embodiment, the radar analysis component 124, responsive to computing a velocity of an object in the driving environment of the AV 100, outputs an indication of the computed velocity to the control system 126. The control system 126 can then control operation of at least one of the mechanical systems 110-114 of the AV 100 based upon the computed velocity. In a non-limiting example, the control system 126 can cause the AV 100 to initiate a mitigation maneuver when an object is moving above a threshold relative velocity with respect to the AV 100 and within a threshold distance of the AV 100 (indicating, for example, that the object may collide with the AV 100 unless the AV 100 changes its motion). The mitigation maneuver can include deceleration or acceleration of the AV 100, or can include evasive maneuvers such as changing a lane in which the AV 100 is traveling, causing the AV 100 to make a turn, etc.

As described above, the radar analysis component 124 can compute a velocity, relative to the AV 100, of an object in a driving environment of the AV 100 based upon radar returns received by the radar sensor system 102. The radar sensor system 102 is configured to emit waves of electromagnetic (EM) radiation, referred to herein as radar signals, into the driving environment of the AV 100 (e.g., by way of a transmitting radar antenna). These radar signals impinge on objects in the driving environment and are reflected by such objects. These reflections, or radar returns, are received by the radar sensor system 102 (e.g., by the same transmitting radar antenna or a distinct receiving radar antenna). Responsive to receipt of the radar returns, the radar sensor system 102 outputs electrical signals that are indicative of the received returns. The radar sensor system 102 can be configured to output, to the computing system 116, radar data that is indicative of values of these electrical signals over time (e.g., by digitally sampling the electrical signals). Stated differently, the radar sensor system 102 outputs, to the computing system 116, radar data that is indicative of radar returns (i.e., reflections of emitted radar waves) received at the radar sensor system 102. The radar sensor system 102 can be configured to repeatedly transmit radar signals into, and receive radar returns from, the driving environment. The radar sensor system 102 outputs additional radar data as additional radar returns are received from the driving environment.

Figure 2:
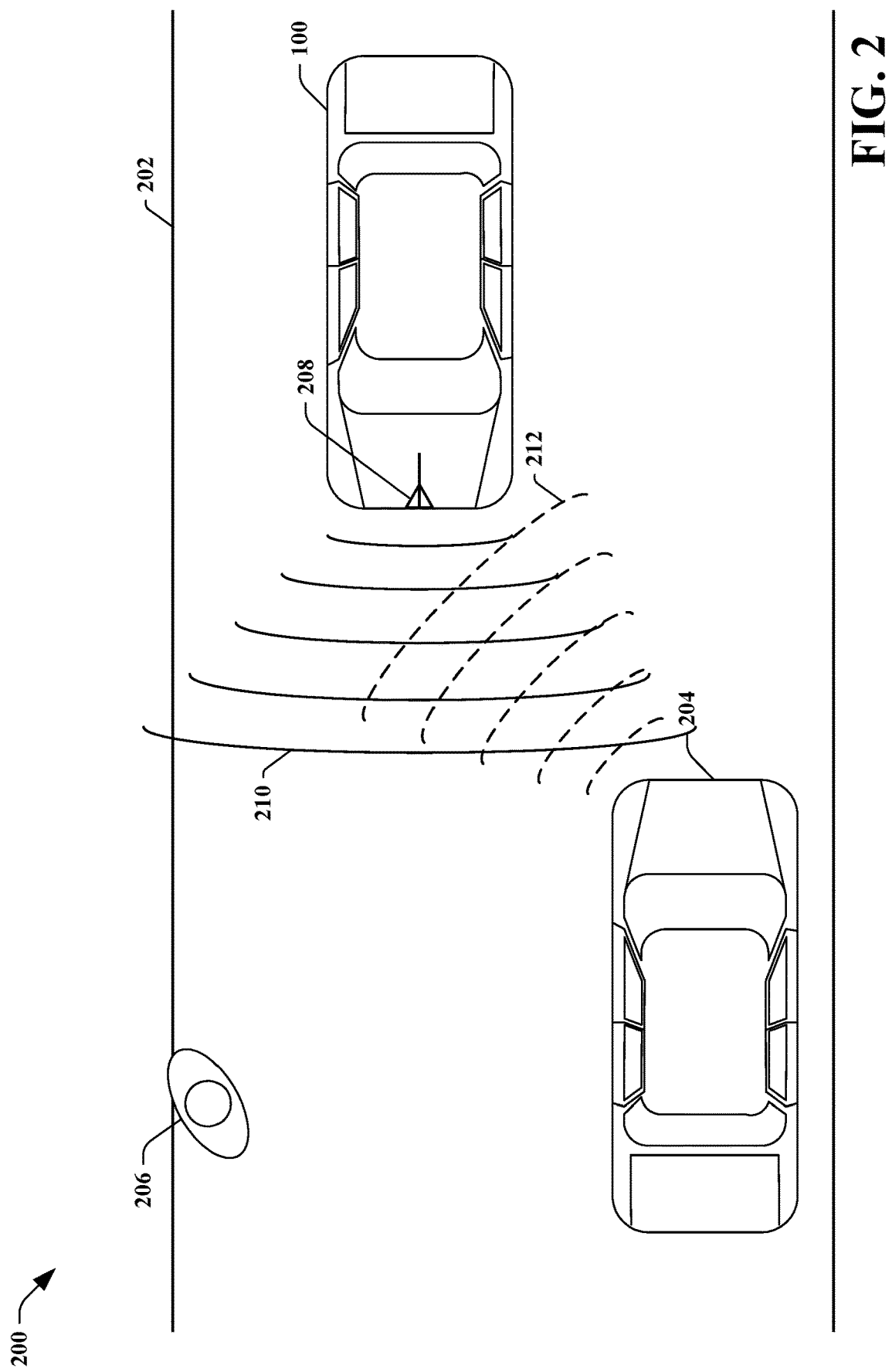
FIG. 2 is a top-down view of an exemplary driving environment of an AV.

By way of example, and with reference now to FIG. 2 an exemplary driving environment 200 of the AV 100 is illustrated. The driving environment 200 includes a roadway 202 on which the AV 100 travels. The driving environment 200 further includes a second vehicle 204 traveling on the roadway 202, and a pedestrian 206 standing in the roadway 202. The AV 100 includes a radar antenna 208 (e.g., included in the radar sensor system 102) that emits radar signals 210 into the driving environment 200. The radar signals 210 impinge on the second vehicle 204, and are reflected by the second vehicle 204. A reflection 212 of the radar signals 210 is received by the radar antenna 208 as a radar return of the emitted radar signals 210. The radar sensor system 102 of the AV 100 outputs radar data based upon the reflection 212 received by the radar antenna 208, wherein the radar data is indicative of the reflection 212.

The radar sensor system 102 can be configured to emit radar signals according to any of various schemes. In a non-limiting example, the radar sensor system 102 can be configured as a continuous-wave (CW) radar system. In still further examples, the radar sensor system 102 can be configured as a constant-frequency CW radar system, a frequency-modulated CW (FMCW) radar system, or a phase-modulated CW (PMCW) radar system.

Figure 3:
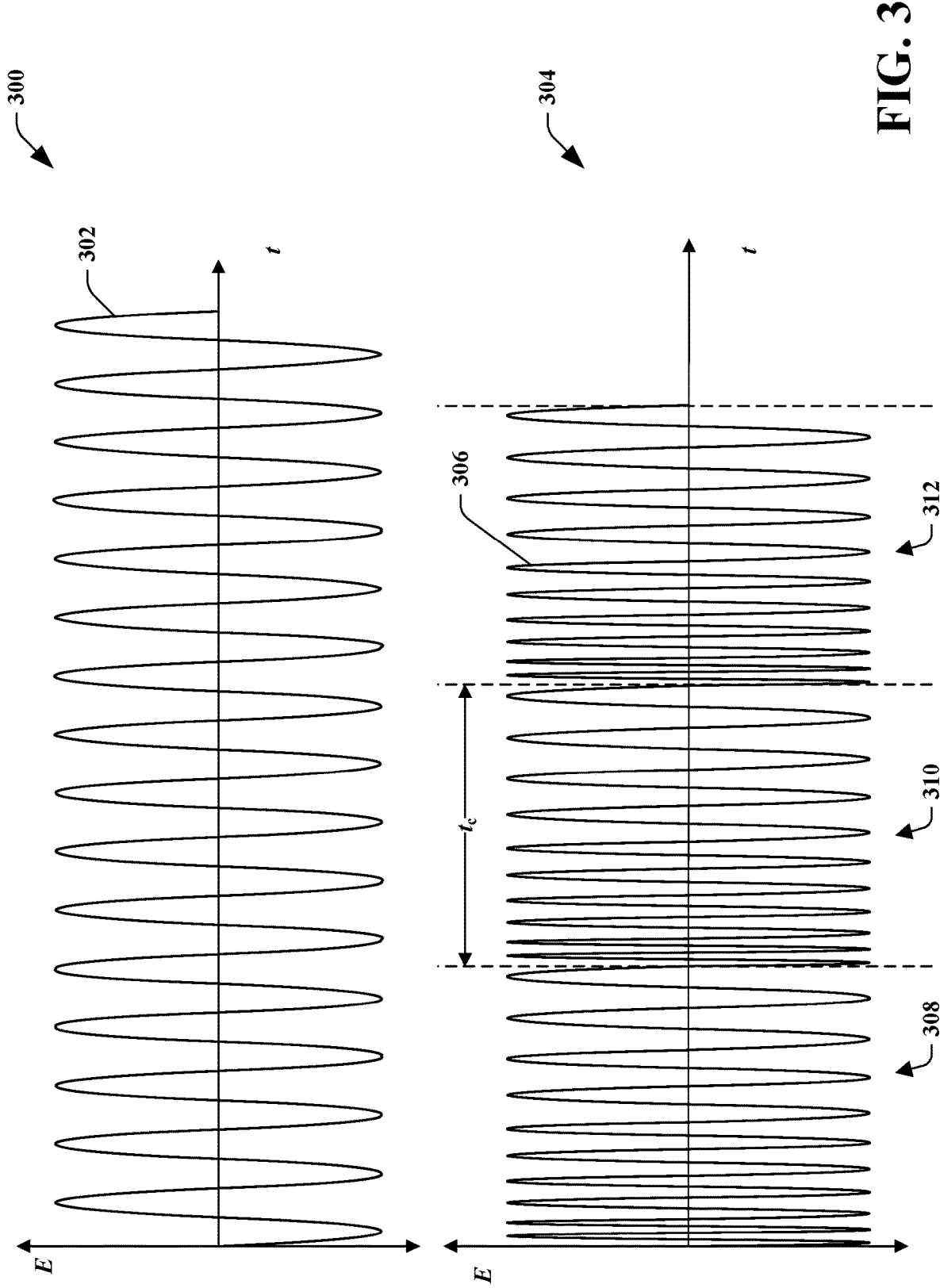
FIG. 3 depicts plots of exemplary radar signal intensities over time.

By way of example, and not limitation, and referring now to FIG. 3, exemplary plots 300, 302 of different EM waves that can be transmitted by the radar sensor system 102 are shown. The plot 300 depicts intensity of the electric field E plotted against time for a continuous, non-modulated wave. In other words, the plot 300 depicts a wave 302 emitted by a continuous radar system that has a constant transmitting frequency. The plot 304 depicts intensity of the electric field E plotted against time for a continuous frequency-modulated wave 306. The frequency-modulated wave 306 depicted in the plot 304 has a frequency that varies over time in a chirped fashion. In other words, the wave 306 comprises a plurality of chirps 308-312 that are repeatedly transmitted, wherein each of the chirps 308-312 has a frequency f that is time-variant throughout the period $t_C$ of the chirp. In exemplary embodiments, the frequency of each of the chirps 308-312 is monotonically increasing or decreasing within the period $t_C$. By way of example, the frequency f of each of the chirps 308-312 can increase or decrease in a linear fashion over time. In other implementations, the frequency f of each of the chirps 308-312 can vary in a non-linear manner. In various embodiments, chirps transmitted by the radar sensor system 102 can be substantially identical. For example, each of the chirps can have a same frequency function with respect to time and can last for a same chirp period $t_C$.

As noted above, the radar analysis component 124 is configured to compute a velocity of an object in the driving environment of the AV 100 based upon radar returns received from the object. The radar analysis component 124 is configured to compute velocity of an object in the driving environment based upon frequency shifting of the radar returns relative to the radar signals transmitted by the radar sensor system 102. The radar analysis component 124 can be configured to repeatedly compute the velocity of an object in the driving environment of the AV 100 to obtain up-to-date information about the motion of objects about the AV 100.

The radar analysis component 124 computes the velocity to a resolution that is limited by a dwell time of the radar sensor system 102 on an object in the driving environment (i.e., a time over which the radar sensor system 102 receives radar returns from the object). A window of radar data used by the radar analysis component 124 to compute a velocity of an object can be referred to as a coherent processing interval (CPI). A CPI can be defined by a start time and an end time. Equivalently, the CPI can be defined for a set of digital samples of an analog radar return by a start sample index and an end sample index, wherein sample indices are indicative of a sequence in which the samples are taken from the analog radar return. The radar analysis component 124 computes a velocity of the object based upon radar data within a defined CPI.

The velocity update rate of radar systems has conventionally been limited by the length of a CPI required to achieve a desired velocity resolution. In other words, a conventional doppler radar generates velocity measurements for a given velocity resolution at a rate no faster than $1/T_{CPI}$, where $T_{CPI}$ is the time-length of a CPI required to achieve the desired velocity resolution. Conventionally, therefore, radar systems have had to sacrifice velocity update rate to achieve improved velocity resolution, or vice versa. These update rate limitations have generally not been practically limiting in applications where a target object is far away from the radar receiver relative to the velocity of the object (e.g., weather, aircraft tracking, or aerial navigation radar systems).

An AV, however, uses radar to determine the velocity of objects that are traveling at high velocity relative to the distance between the objects and the AV. In order to achieve a velocity resolution that is fine enough to be useful in evaluating the motion of objects in the driving environment of the AV, a conventional radar system would be limited to an update rate low enough to no longer be practical for use in planning maneuvers of the AV.

By contrast, the AV 100 is configured to allow velocity of an object in a driving environment of the AV 100 to be measured, using radar, more frequently for a given velocity resolution than can be achieved with conventional radar systems. Stated differently, the computing system 116 of the AV 100 can compute the velocity of an object based upon radar data generated by the radar sensor system 102 such that the velocity update rate and the velocity resolution are uncoupled. By way of example, the radar analysis component 124 can compute velocities of objects in the driving environment of the AV 100 to a velocity resolution of greater than or equal to 0.01 m/s with an update rate of greater than or equal to 500 Hz, greater than or equal to 1 kHz, or greater than or equal to 2 kHz.

Figure 4:
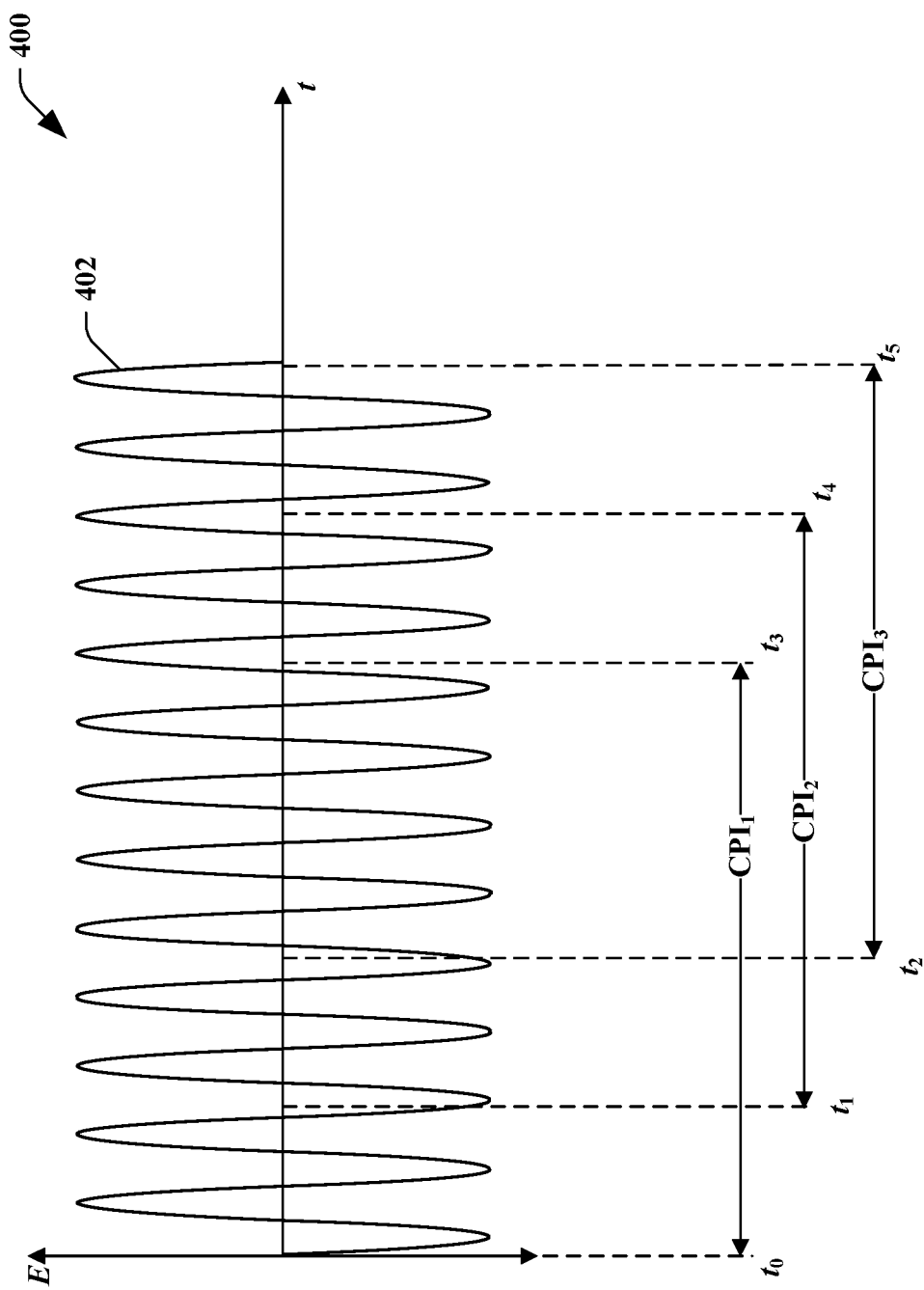
FIG. 4 is a plot of an exemplary radar return.

The radar analysis component 124 is configured to compute successive velocity measurements based upon CPIs that overlap in the time/sample space. For instance, the radar analysis component 124 can employ a sliding window that defines a CPI for each successive velocity measurement. By way of example, and referring now to FIG. 4, a plot 400 of an exemplary radar return 402 from an object in a driving environment of an AV is illustrated. The radar return 402 is defined from a time of to to a time $t_5$, which time period further includes times $t_1$, $t_2$, $t_3$, and $t_4$, in sequential order. The radar analysis component 124 can compute a first velocity of the object to which the radar return 402 pertains based upon a first portion of the radar return 402 defined by a first CPI, $CPI_1$. $CPI_1$ is defined from time to $t_0$ a time $t_3$, and a length of $CPI_1$ in time determines a resolution to which the radar analysis component 124 computes the first velocity. The first velocity of the object is approximately an average velocity of the object over the time period spanned by $CPI_1$. The radar analysis component 124 can compute a second velocity of the object based upon a second portion of the radar return 402 defined by a second CPI, $CPI_2$, which is defined from times $t_1$ to $t_4$. The radar analysis component 124 can further compute a third velocity of the object based upon a third portion of the radar return 402 defined by a third CPI, $CPI_3$, which is defined from times $t_2$ to $t_5$. $CPI_1$, $CPI_2$, and $CPI_3$ can be set to a same length in time in order to achieve a same desired velocity resolution, although the radar analysis component 124 is not so-limited.

In exemplary embodiments, the radar analysis component 124 is configured to compute the first velocity responsive to receiving the portion of the radar return 402 that is defined from to $t_0$ $t_3$. The radar analysis component 124 can further be configured to compute an updated velocity value in response to additional radar data being received. By way of example, subsequent to receiving a portion of the radar return 402 that is defined from a time $t_3$ to the time $t_4$, the radar analysis component 124 can compute the second velocity based upon the portion of the radar return 402 included in $CPI_2$. Since $CPI_2$ overlaps with $CPI_1$ and therefore shares with $CPI_1$ the portion of the radar return 402 that is defined from $t_1$ to $t_3$, $CPI_2$ can have a same time length as $CPI_1$. Therefore, the radar analysis component 124 is able to compute the second velocity value to the same resolution as the first velocity value computed based upon $CPI_1$. Similarly, when additional radar data is received from time $t_4$ to $t_5$, the radar analysis component 124 can compute a third velocity based upon the portion of the return 402 defined over $CPI_3$. The radar analysis component 124 can therefore compute an updated velocity of the object whenever additional radar data is received, rather than waiting for the time length of another CPI to compute an additional velocity measurement.

Figure 5:
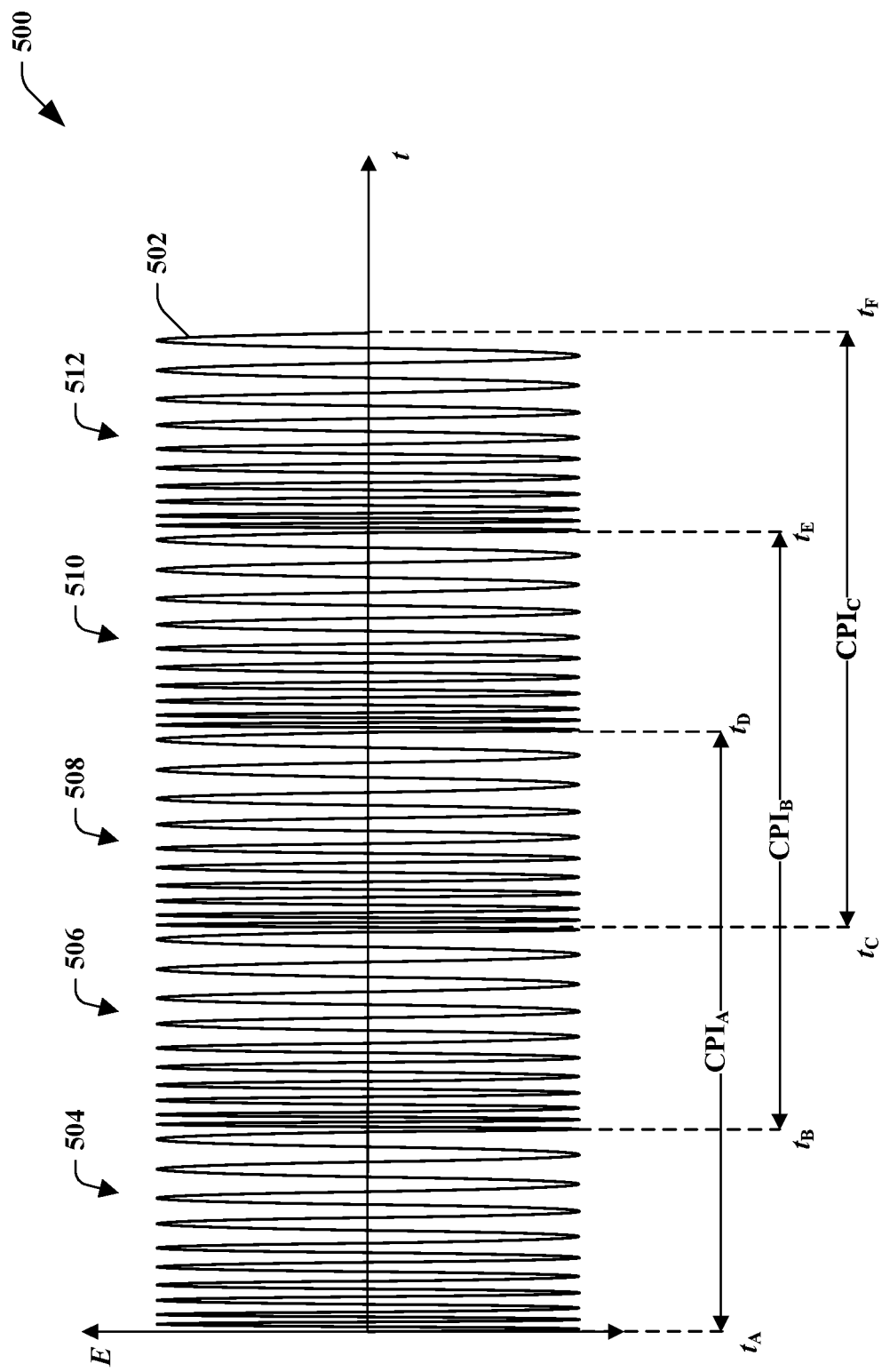
FIG. 5 is a plot of another exemplary radar return.

In some embodiments, a radar signal transmitted by the radar sensor system 102 exhibits a periodicity that can be used to define the CPI for the radar analysis component 124. For example, an FMCW radar system can transmit a chirped radar signal, and a CPI used by the radar analysis component 124 can be based upon a number of chirps. Referring now to FIG. 5, a plot 500 of an exemplary chirped radar return 502 is illustrated. The chirped radar return 502 includes a plurality of chirps 504-512. The first chirp 504 is received from a time $t_A$ to a time $t_B$, the second chirp 506 is received from the time $t_B$ to a time $t_C$, the third chirp 508 is received from the time $t_C$ to a time $t_D$, the fourth chirp 510 is received from the time $t_D$ to a time $t_E$, and the fifth chirp 512 is received from the time $t_E$ to a time $t_F$.

A CPI with respect to the chirped radar return 502 can be defined as a number of chirps, wherein the number of chirps is sufficiently great, given the time length of the chirps, to yield a desired velocity resolution. For example, if the CPI length is defined as 3 chirps, a $CPI_A$ can be defined as extending across the chirps 504-508, corresponding to a period from $t_A$ to $t_D$. Continuing the example, a $CPI_B$ can be defined as extending across chirps 506-510, corresponding to a period from $t_B$ to $t_E$, and a $CPI_C$ can be defined as extending across chirps 508-512, corresponding to a period from $t_C$ to $t_F$. The radar analysis component 124 can therefore compute velocities based upon the chirped return 502 using a sliding window CPI that is defined in terms of a chirp width.

In embodiments wherein the radar sensor system 102 is a chirped radar system, the radar analysis component 124 can employ a first in first out scheme for computing updated velocities of an object. In other words, when an additional chirp or plurality of chirps is received, an updated velocity can be computed by the radar analysis component 124 using the additional chirp(s) and the chirps used to compute an immediately preceding velocity, less a number of the additional chirps received beginning with the oldest of the chirps. In some embodiments, the radar analysis component 124 can be configured to update the velocity responsive to receiving any additional chirp. In other embodiments, the radar analysis component 124 can be configured to compute an updated velocity responsive to receiving a predefined number of chirps (e.g., 2 additional chirps, 3 additional chirps, 5 additional chirps, etc.). By way of example, and not limitation, the radar analysis component 124 can be configured to compute a first velocity based upon a CPI of ten chirps. Continuing the example, the radar analysis component 124 can receive an additional five chirps and can compute a second velocity based upon a CPI that includes the five additional chirps and the most recent five chirps of the previous CPI (having discarded the five oldest chirps of the previous CPI). In such embodiments, a velocity update rate of the radar analysis component 124 may be limited solely by the chirp rate of the radar sensor system 102.

Figure 6:
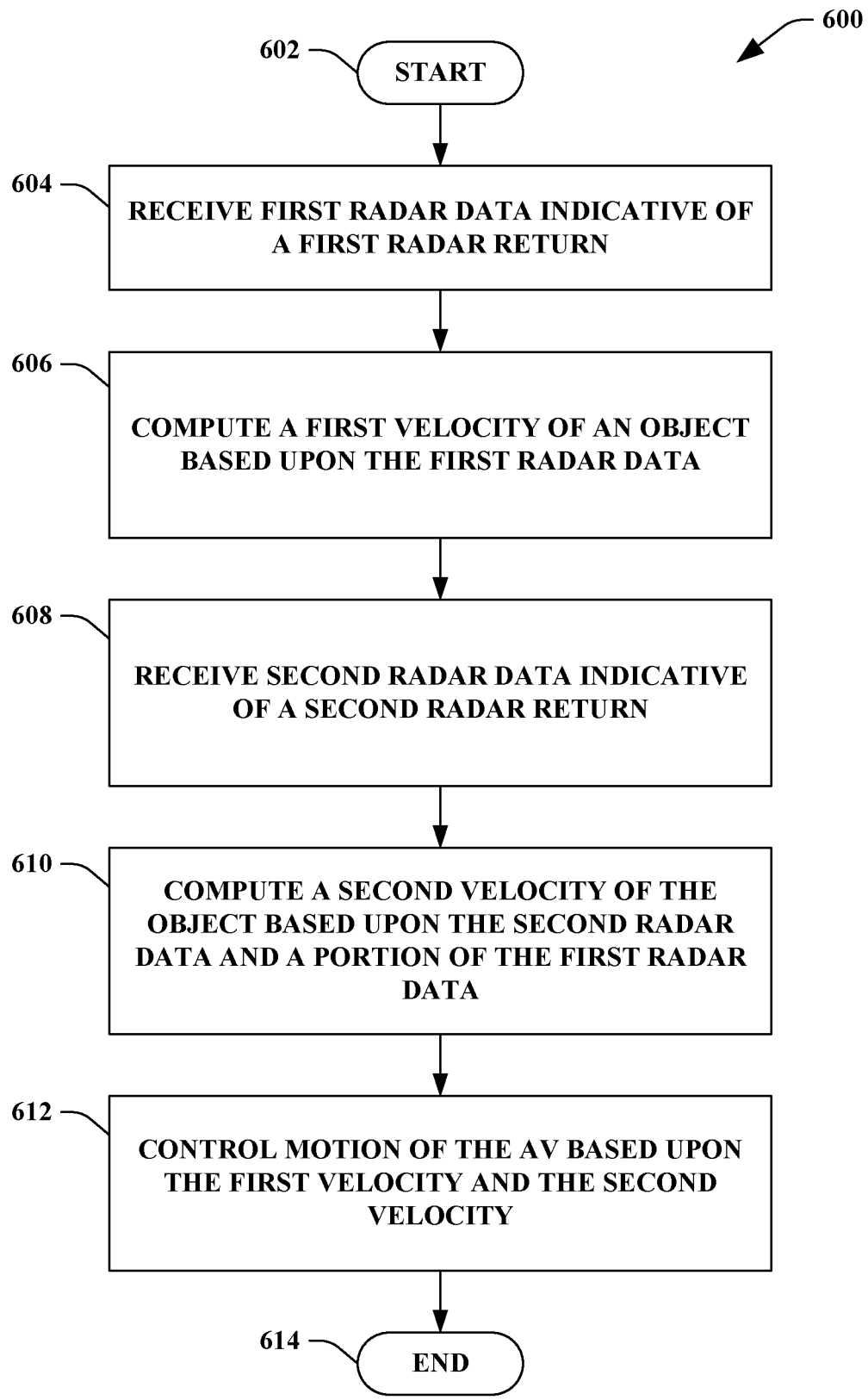
FIG. 6 is a flow diagram illustrating an exemplary methodology for computing velocities of objects in a driving environment of an AV based upon radar data, and controlling the AV based upon such velocities.

FIG. 6 illustrates an exemplary methodology relating to controlling an AV based upon velocities of objects in a driving environment that are determined based upon radar. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for controlling operation of an AV based upon radar is illustrated. The methodology 600 starts at 602, and at 604 first radar data that is indicative of a first radar return is received. The first radar data can be generated by digitally sampling the first radar return upon receiving the first radar return at a radar system mounted on an AV. The first radar return is a reflection, from an object in a driving environment of the AV, of a radar signal emitted into the driving environment by the radar system. At 606, a first velocity of the object is computed based upon the first radar data received at 604.

At 608, second radar data is received that is indicative of a second radar return. The second radar return can be an additional return received from the object over a period of time subsequent to a period of time over which the first radar return was received. In exemplary embodiments, the period of time represented by the second radar return is shorter than the period of time represented by the first radar return. At 610, a second velocity of the object is computed based upon the second radar data and a portion of the first radar data. In various embodiments, the second velocity of the object is computed based upon the second radar data and the first radar data less an oldest portion of the first radar data having a same duration as the period of time represented by the second radar data.

At 612 motion of the AV is controlled based upon the first velocity and the second velocity, whereupon the methodology 600 ends 614. By way of example, and not limitation, the AV can predict that a collision with the object will occur based upon the first and second velocities of the object, and the AV can be controlled based in order to avoid the collision (for instance, by turning or decelerating the AV).

Figure 7:
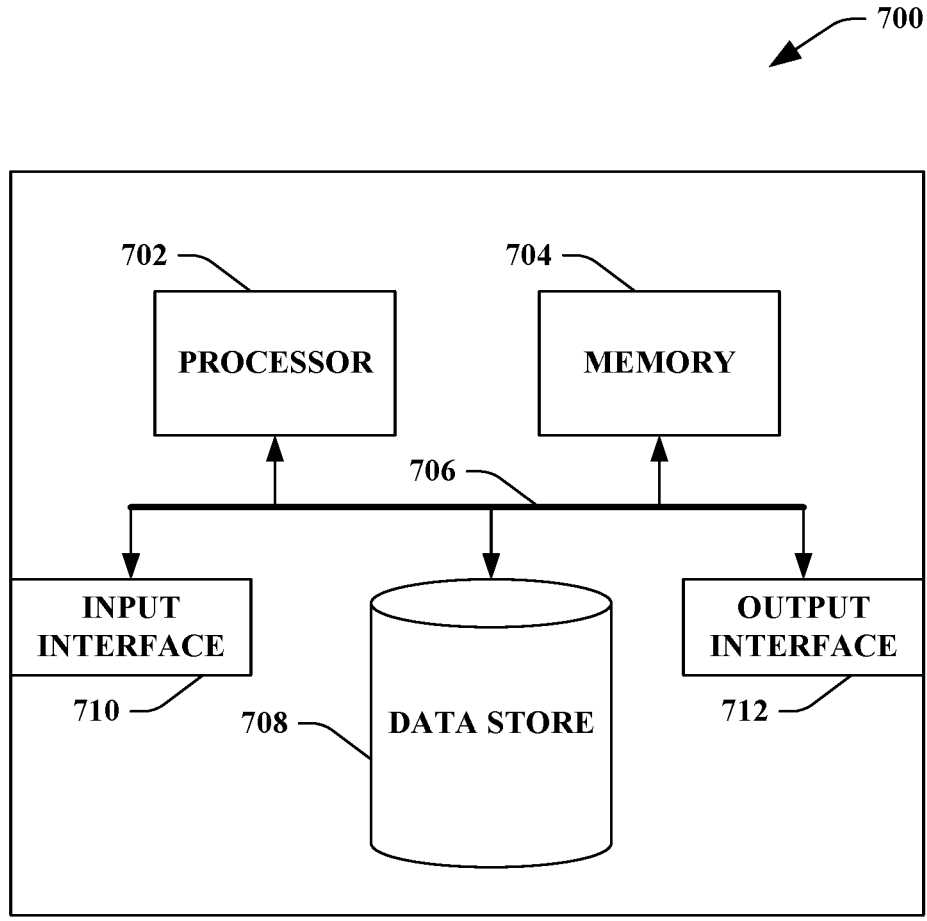
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 116. The computing device 700 includes at least one processor 702 that executes instructions that are stored in a memory 704. The instructions may be, for instance, instructions for implementing functionality described as being carried out by one or more modules, components, or systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also store radar data, velocity data, etc.

The computing device 700 additionally includes a data store 708 that is accessible by the processor 702 by way of the system bus 706. The data store 708 may include executable instructions, sensor data, radar data, velocity data, etc. The computing device 700 also includes an input interface 710 that allows external devices to communicate with the computing device 700. For instance, the input interface 710 may be used to receive instructions from an external computing device, etc. The computing device 700 also includes an output interface 712 that interfaces the computing device 700 with one or more external devices. For example, the computing device 700 may transmit control signals to the vehicle propulsion system 110, the braking system 112, and/or the steering system 114 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle comprising:
    a radar system configured to emit a radar signal into a driving environment of the vehicle and to receive radar returns from objects in the driving environment; and
    a computing system configured to perform acts comprising:
        receiving first radar data from the radar system, the first radar data indicative of a radar return received from an object in the driving environment by the radar system over a first period of time;
        computing, based upon the first radar data, a first value that is representative of velocity of the object relative to the vehicle during the first period of time;
        receiving, from the radar system, additional radar data that is indicative of a radar return received from the object by the radar system after the first period of time;
        computing, based upon the additional radar data and a subset of the first radar data, a second value that is representative of velocity of the object relative to the vehicle during a second period of time that partly overlaps with the first period of time; and
        controlling at least one of a propulsion system, a steering system, or a braking system of the vehicle based upon the first value and the second value.

2. The vehicle of claim 1, wherein the radar system emits the radar signal such that the radar signal has a varying frequency.

3. The vehicle of claim 2, wherein the radar signal is emitted by the radar system as a plurality of chirps.

4. The vehicle of claim 2, wherein the first radar data comprises a first plurality of chirps, the additional radar data comprises a second plurality of chirps, wherein computing the second value is based upon the second plurality of chirps and at least one of the first plurality of chirps.

5. The vehicle of claim 2, wherein the first radar data comprises a plurality of chirps, and wherein the additional radar data consists of a single chirp.

6. The vehicle of claim 1, wherein the radar system is a continuous wave (CW) radar system.

7. The vehicle of claim 6, wherein the radar system is a frequency modulated CW (FMCW) radar system.

8. The vehicle of claim 6, wherein the radar system is a phase modulated CW (PMCW) radar system.

9. The vehicle of claim 1, wherein a velocity resolution of the first velocity and the second velocity is finer than 0.01 m/s, and wherein further the computing system is configured to update a velocity of the object at a rate of greater than or equal to 500 Hz.

10. The vehicle of claim 1, wherein the first value is representative of an average velocity of the object over the first period of time.

11. A method for controlling an autonomous vehicle (AV) based upon radar, the method comprising:
    receiving first radar data that is indicative of a first radar return received from an object in a driving environment of the AV by a radar system mounted on the AV;
    computing a first value that is representative of velocity of the object during a first period of time based upon the first radar data;
    receiving second radar data that is indicative of a second radar return received from the object by the radar system after the radar system receives the first radar return;
    computing a second value that is representative of velocity of the object during a second period of time that partly overlaps with the first period of time based upon the second radar data and a subset of the first radar data; and
    controlling motion of the AV by way of a steering system, a propulsion system, or a braking system, based upon the first value and the second value.

12. The method of claim 11, wherein computing the first value is based upon a frequency shift of the first radar return relative to a first radar signal emitted into the driving environment by the radar system of the AV.

13. The method of claim 11, wherein the subset of the first radar data is a most-recent portion of the first radar data.

14. The method of claim 11, wherein the first radar data comprises a plurality of chirps and the second radar data comprises an additional chirp, the subset of the first radar data excluding a first chirp in the plurality of chirps.

15. The method of claim 11, wherein the first radar data is generated by digitally sampling the first radar return.

16. The method of claim 11, further comprising emitting a radar signal into the driving environment of the AV, wherein the radar signal is a continuous-wave radar signal.

17. The method of claim 16, wherein the radar signal is a constant-frequency radar signal.

18. An autonomous vehicle (AV) comprising:
    a radar system that emits a radar signal that comprises a plurality of frequency-variant chirps into a driving environment of the AV and receives reflections of the radar signal from objects in the driving environment;

a propulsion system;
a steering system;
a braking system; and
a computing system that comprises:
  a processor; and
  memory that stores instructions that, when executed by the processor, cause the processor to perform acts comprising:
    receiving first radar data that comprises a first plurality of chirps, the first plurality of chirps being representative of a radar return received by the radar system from an object in the driving environment over a first period of time;
    computing, based upon the first chirps, a first value that is representative of velocity of the object during the first period of time;
    receiving second radar data that comprises a second plurality of chirps, the second plurality of chirps being representative of a radar return received by the radar system from the object in the driving environment after the first period of time;
    computing, based upon the second chirps and a subset of the first chirps, a second value that is representative of velocity of the object during a second period of time that partly overlaps with the first period of time; and
    controlling at least one of the propulsion system, the steering system, or the braking system based upon the first velocity and the second velocity.

19. The AV of claim 18, wherein the radar system is a frequency-modulated continuous wave (FMCW) radar system.

20. The AV of claim 18, wherein the first value and the second value are computed based upon a same number of chirps.

\* \* \* \* \*